(12) United States Patent
Bartolone

(10) Patent No.: US 6,176,501 B1
(45) Date of Patent: Jan. 23, 2001

(54) INDEPENDENT FRONT SUSPENSION ECCENTRIC ALIGNMENT DEVICE

(75) Inventor: Dean F. Bartolone, Lafayette, IN (US)

(73) Assignee: Fluidrive, Inc., Brookston, IN (US)

(*) Notice: Under 35 U.S.C. 154(b), the term of this patent shall be extended for 0 days.

(21) Appl. No.: 09/248,464

(22) Filed: Feb. 11, 1999

(51) Int. Cl.$^7$ .................................................. B60G 7/02
(52) U.S. Cl. ........................................................ 280/86.756
(58) Field of Search ..................... 280/86.751, 86.754, 280/86.756

(56) References Cited

U.S. PATENT DOCUMENTS

| | | |
|---|---|---|
| D. 335,851 | 5/1993 | Lofy . |
| 996,473 | 6/1911 | Estes . |
| 2,154,569 | 4/1939 | Hicks . |
| 2,835,521 | 5/1958 | White . |
| 3,124,370 | 3/1964 | Traugott . |
| 4,026,578 | 5/1977 | Mattson . |
| 4,213,631 | 7/1980 | Wilkerson . |
| 4,267,896 | 5/1981 | Hendriksen . |
| 4,313,617 | 2/1982 | Muramatsu . |
| 4,500,110 | 2/1985 | McWhorter . |
| 4,641,853 * | 2/1987 | Specktor et al. ................. 280/86.756 |
| 4,754,991 * | 7/1988 | Jordan ............................. 280/86.756 |
| 4,842,295 | 6/1989 | Hawkins . |
| 4,921,271 * | 5/1990 | Berry et al. ..................... 280/86.756 |
| 4,973,076 | 11/1990 | Fayard . |
| 4,982,977 | 1/1991 | Shimada . |
| 5,085,457 | 2/1992 | Young . |
| 5,104,141 | 4/1992 | Grove . |
| 5,156,414 | 10/1992 | Fayard . |
| 5,238,262 | 8/1993 | Nunes . |
| 5,374,075 | 12/1994 | Lee . |
| 5,382,043 | 1/1995 | Jordan . |
| 5,403,031 | 4/1995 | Gottschalk . |
| 5,779,260 * | 7/1998 | Reilly et al. ..................... 280/86.756 |

* cited by examiner

Primary Examiner—Michael Mar
Assistant Examiner—Lynda Jasmin
(74) Attorney, Agent, or Firm—George Pappas

(57) ABSTRACT

An alignment device for adjusting the camber and caster angles of a wheel in an independent front suspension. The wheel is supported on a knuckle assembly which is pivotally connected to upper and lower control arms which are pivotally connected to the vehicle frame. The control arms include bushings received in control arm mounting cylinders which are located between mounting brackets extending from the vehicle frame. Mounting bracket holes at each end of the bushing bore are aligned and, after locating an alignment device eccentric boss at the bracket holes, a mounting bolt is placed through holes in the eccentric boss and through the bushing bore thereby pivotally securing the control arm mounting cylinder. The eccentric boss hole extends through and is axially offset from a circular portion which is received within the mounting bracket hole. Contact surfaces on the eccentric boss are selectively engaged for rotating the boss and circular portion which is guided within the mounting bracket hole, thereby causing the mounting bolt, bushing and control arm to selectively move in an eccentric path and thereby selectively adjusting the camber and caster angles of the wheel. A set screw is provided and extends through an adapter plate of the eccentric boss for selectively fixing the rotational orientation of the eccentric boss and, thus, the camber and caster angles of the wheel.

16 Claims, 3 Drawing Sheets

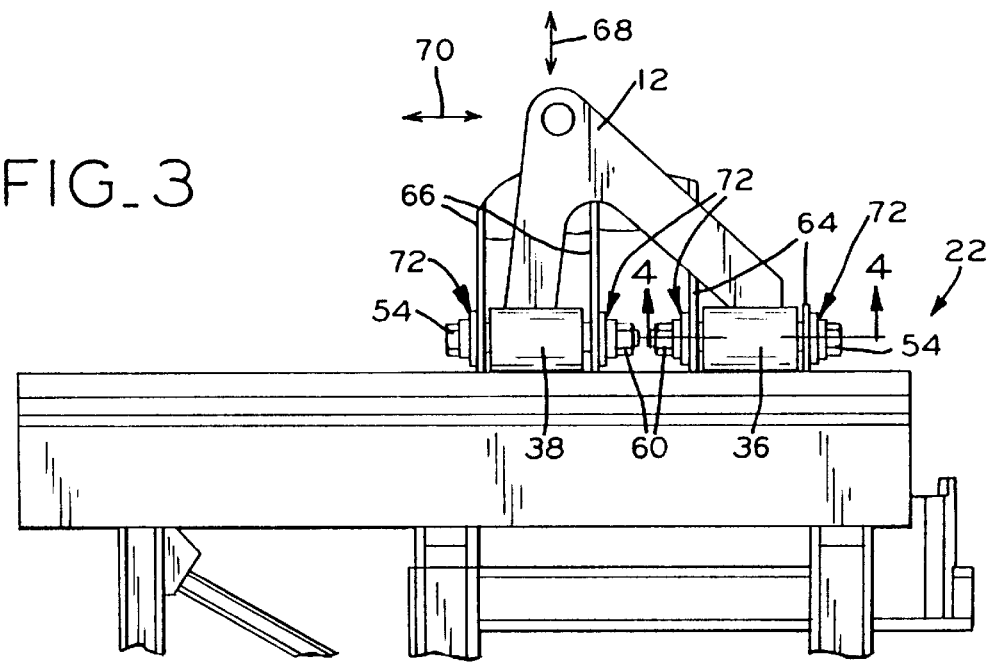
FIG_3
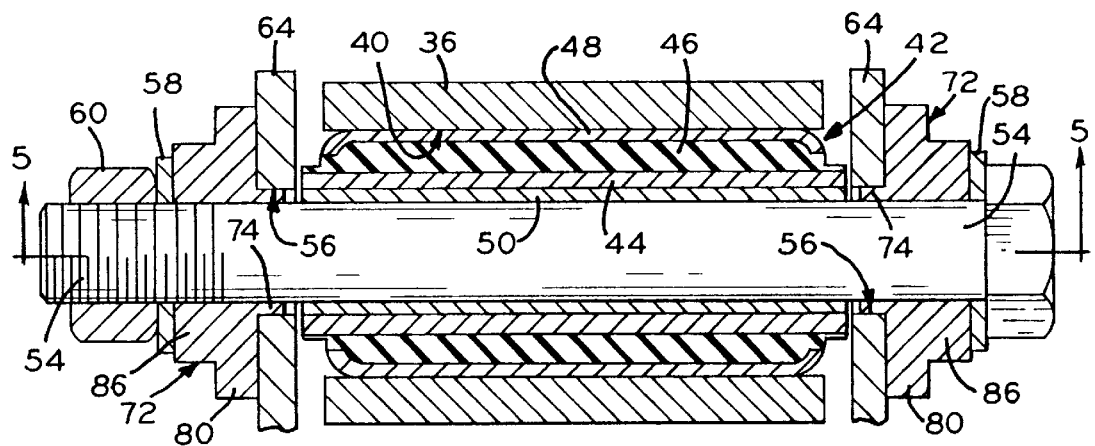
FIG_4
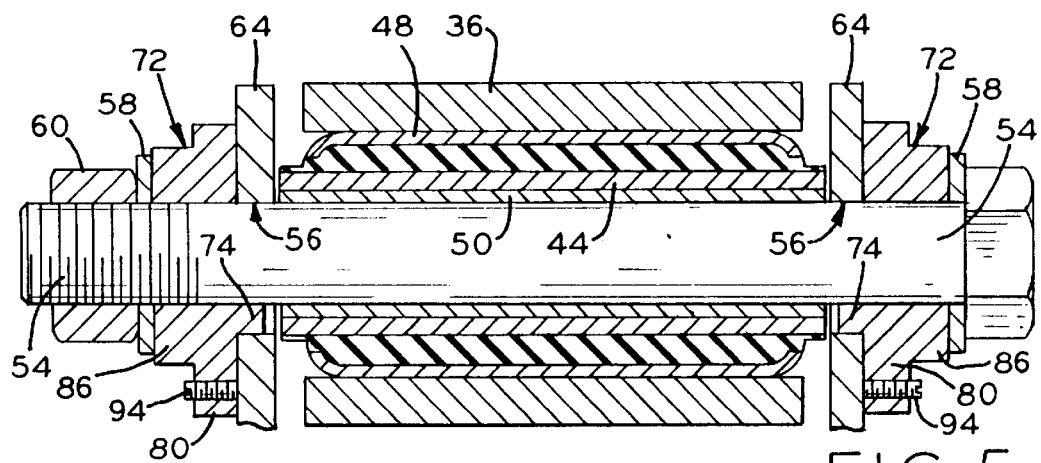
FIG_5

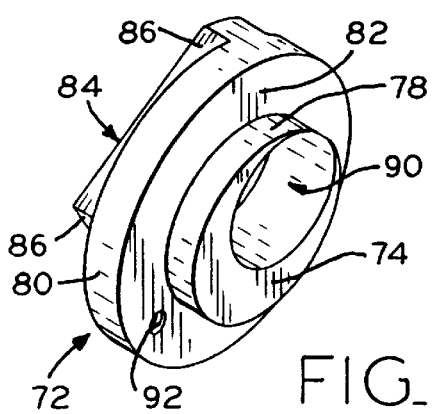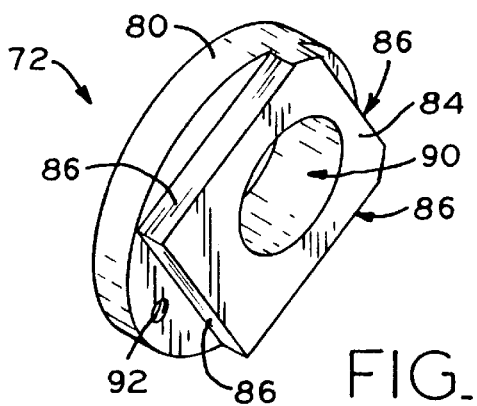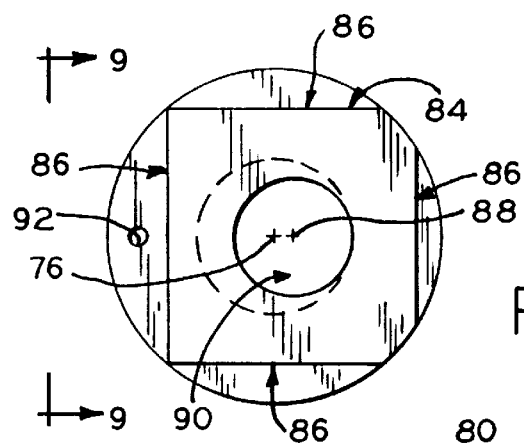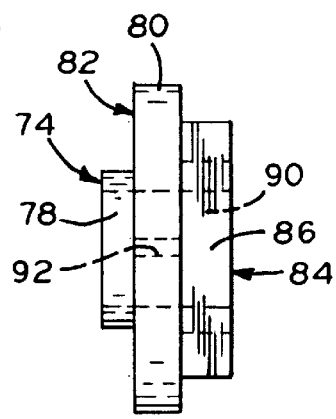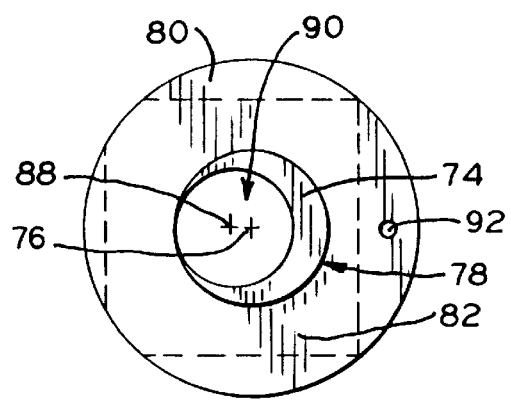

INDEPENDENT FRONT SUSPENSION ECCENTRIC ALIGNMENT DEVICE

TECHNICAL FIELD

The present invention relates to the technical field of vehicle independent front suspensions. More particularly, the present invention relates to an eccentric device at the pivotal connection between the front suspension control arms and the vehicle frame assembly for adjusting the vehicle wheel geometry, namely, the wheel camber and caster angles.

BACKGROUND OF THE INVENTION

Independent front suspension assemblies are today very commonly used on vehicles such as automobiles and trucks. Typically, the independent front suspension assembly includes a knuckle assembly whereupon the front wheel is rotatably supported. The knuckle assembly is pivotally attached to upper and lower control arms so as to rotate vertical about a general axis. A steering rod is pivotally connected to the knuckle assembly for selectively turning the knuckle assembly and front wheel about the vertical axis and thereby steering the vehicle. The control arms are pivotally connected to the vehicle frame so as to pivot about generally horizontal axes thereby allowing the knuckle assembly and wheel to move vertically up and down. Suspension components such as shock absorbers and/or springs are connected to one or both of the control arms for resisting and dampening the vertical motion of the wheel.

The control arms are pivotally connected to the vehicle frame assembly using rubber bushings which are pivotally supported between mounting brackets attached to and extending from the vehicle frame assembly. More specifically, the upper and lower control arms are both provided with two mounting cylinders, each of which are adapted to receive a rubber bushing. The rubber bushings are provided with a central longitudinal bole for receiving a bolt therethrough. The mounting cylinders and bushings therein are located between respective mounting brackets placing the bushing longitudinal bore in alignment with mounting bracket holes at each end of the mounting cylinders. A bolt is provided and extends through the mounting bracket hole at one end of the cylinder, through the bushing longitudinal bore and the mounting bracket hole at the other end of the cylinder whereat a nut is threaded thereon for retaining the bolt thereat. The control arm thus pivots about an axis which is generally horizontal and collinear with its mounting cylinders and respective bushings and bolts.

As can be appreciated, the bracket holes locations serve to properly locate the knuckle assembly and wheel and set or otherwise affect the wheel camber and caster angles.

Unfortunately, due to manufacturing inconsistences the mounting holes in the bracket are not always located at the optimal location for achieving the correct camber and caster angles. In view of this and the potential need to adjust the camber and caster angles both initially and after the vehicle has been placed in operation, a need exists for a device capable of shifting or otherwise moving the control arm horizontal axis of rotation for effectively, efficiently and generally inexpensively adjusting the wheel camber and caster angles.

SUMMARY OF THE INVENTION

It is the principal object of the present invention to overcome the above-discussed disadvantages associated with prior independent front suspensions. It is further the object of the present invention to provide a device for use on or in conjunction with existing independent suspension control arms which effectively, efficiently and generally inexpensively allows the control arm generally horizontal angle of rotation to be adjusted so as to thereby selectively adjust the camber and caster angles of the wheel.

The present invention overcomes the disadvantages associated with prior independent front suspensions and achieves the desired and other objects by providing an eccentric boss at each of the mounting bracket holes at the longitudinal ends of at least one of the control arm mounting cylinders through which the mounting bolts are received whereby the mounting bolt and, thus, the axis of rotation are selectively adjustable. Each of the eccentric bosses include a circular portion which is slightly smaller than the mounting bracket holes and which are received therein. An adapter plate is formed integrally with the circular portion, is located adjacent the circular portion, and extends radially beyond both the circular portion and the outside diameter of the bracket hole in which the circular portion is received. A rotational adjustment portion, also integrally formed therewith, is located adjacent the adapter plate, thus, sandwiching the adapter plate between the rotational adjustment portion and the circular portion. The rotational adjustment portion includes at least one tool contact surface whereat a tool may selectively be placed for cooperation therewith and for rotating the boss about a longitudinal axis extending through the center of the circular portion. A bolt hole is provided and extends through the eccentric boss circular portion, adapter plate and rotational adjustment portion. The bolt hole has a longitudinal axis which is offset from the circular portion longitudinal axis. Thus, by rotating the boss and circular portion, the mounting bolt extending through the bolt hole and supporting the bushing and control arm mounting cylinder is selectively moved within the mounting bracket hole, up, down, left and right for thereby also selectively adjusting the camber and caster angles of the wheel. An eccentric boss is typically used in the mounting bracket holes at the longitudinal ends of both the front and rear mounting cylinders of the upper control arm. Eccentric bosses may similarly be installed at the longitudinal ends of the front and rear mounting cylinders of the lower control arm.

Preferably, the adapter plate has a generally circular outside surface and a longitudinal axis which is collinear with the circular portion longitudinal axis. Additionally, the rotational adjustment portion preferably includes four tool contact surfaces circumscribing a rotational adjustment portion longitudinal axis which is collinear with the bolt hole longitudinal axis. The four tool contact surfaces form a square nut for easily and readily receiving and being rotatable with a common wrench.

More preferably, the adapter plate extends radially beyond at least one of the tool contact surfaces whereat a threaded set screw hole is provided and extends through the adapter plate. A set screw is threadingly received therein and is adapted to selectively contact the mounting bracket adjacent the adapter plate so as to thereby selectively prevent rotational movement of the eccentric boss. Although the set screw prevents rotational movement of the eccentric boss, such rotational movement is also prevented via the bushing which extends to and is in contact with the mounting brackets at the longitudinal ends of the mounting cylinders. The inner sleeve of the bushing is compressed longitudinally upon tightening the mounting bolt thereby further fixing the sleeve and bosses at each end thereof at the desired rotational angle for the desired camber and caster wheel angles.

In one form thereof, the present invention is directed to an alignment device used in an independent front suspension including a knuckle assembly pivotally supported by upper and lower control arms. The upper and lower control arms are pivotally connected to a vehicle frame assembly. One of the control arms has two mounting cylinders and each of the mounting cylinders are located between mounting brackets which extend from the vehicle frame assembly. Mounting holes are provided on the mounting brackets. The holes are aligned with the mounting cylinders therebetween and bolts extend through each of the mounting cylinders and bracket holes at the cylinder longitudinal ends thereby pivotally attaching each of the mounting cylinders between their respective mounting brackets. The alignment device includes an eccentric boss located at each of the mounting bracket holes at the longitudinal ends of at least one of the control arm cylinders. The boss includes a circular portion having a longitudinal axis and an outside diameter smaller than the bracket holes and at least partially received therein. A bolt hole is provided extending through the circular portion and having a longitudinal axis which is offset from the circular portion longitudinal axis. The boss further includes an adapter plate adjacent the circular portion extending radially beyond the circular portion outside diameter and bracket mounting holes. A rotational adjustment portion is further provided adjacent the adapter plate having a tool contact surface whereat a tool may selectively be placed for rotating the boss about the circular portion longitudinal axis.

BRIEF DESCRIPTION OF THE DRAWINGS

The above-mentioned and other features and objects of this invention and the manner of obtaining them will become more apparent and the invention itself will be better understood by reference to the following description of embodiments of the invention taken in conjunction with the accompanying drawings wherein:

FIG. 3 is a top partial plan view of one side of the assembly shown in FIG. 1

FIG. 4 is an enlarged cross sectional view of a pivotal connection between a control arm and frame assembly taken generally along line 4—4 in FIG. 3;

FIG. 5 is a cross sectional view of the pivotal connection shown in FIG. 4 taken generally along line 5—5 thereof;

FIG. 6 is a perspective view of an eccentric boss constructed in accordance with the principles of the present invention;

FIG. 7 is a perspective view of the back side of the eccentric boss shown in FIG. 6, FIG. 8 is a rear elevation view of the eccentric boss shown in FIGS. 6 and 7, FIG. 9 is a side elevation view of the eccentric boss taken generally along line 9—9 in FIG. 8; and, FIG. 10 is a front elevation view of the eccentric boss shown in FIGS. 6 and 7.

Corresponding reference characters indicate corresponding parts throughout the several views of the drawings.

The exemplifications set out herein illustrate preferred embodiments of the invention in one form thereof and such exemplifications are not to be construed as limiting the scope of the disclosure or the scope of the invention in any manner.

DESCRIPTION OF SPECIFIC EMBODIMENTS

Figure 1:
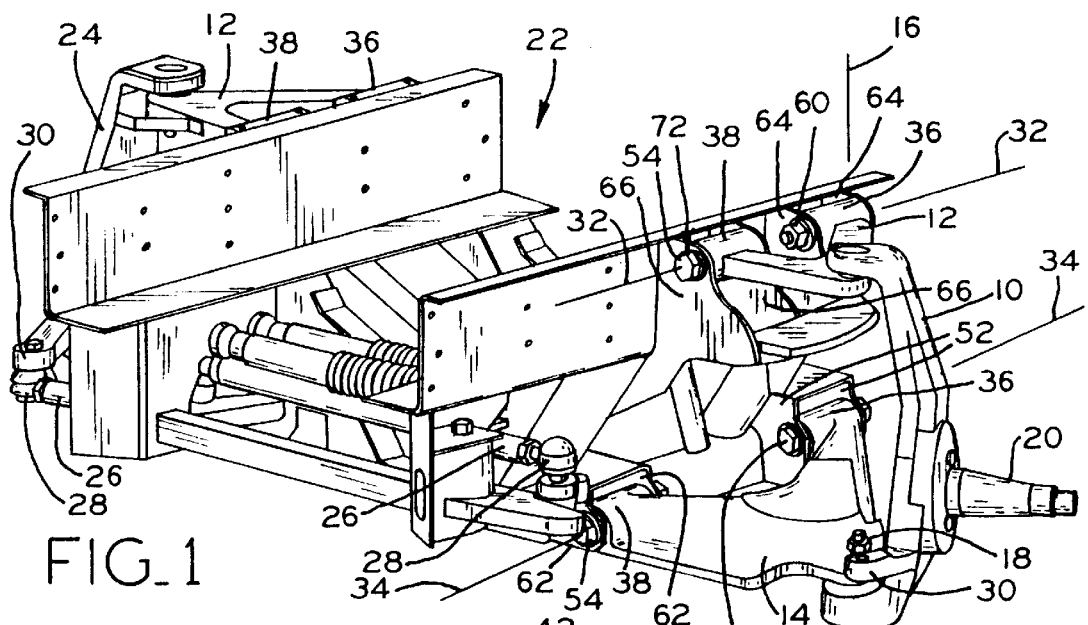
FIG. 1 is a perspective view of an independent front suspension assembly including a knuckle assembly pivotally connected to a vehicle frame using upper and lower control arms and incorporating an eccentric boss in accordance with the principles of the present invention.

Referring initially to FIG. 1, a knuckle assembly 10 is shown pivotally connected to an upper control arm 12 and a lower control arm 14 so as to pivot about a generally vertical axis 16. Knuckle assemblylo is pivotally connected to control arms 12 and 14 in a known and customary manner using, for example, ball joints 17 and nuts 18. Knuckle assembly 10 is further adapted to rotatably carry a vehicle wheel (not shown) on its axle 20, also in a known and customary manner.

Upper and lower control arms 12 and 14 are pivotally connected to the vehicle frame assembly or a vehicle frame subassembly generally designated by the numeral 22 which is adapted to be attached to the vehicle main frame assembly and become a part thereof As used herein the term "frame assembly" is intended to mean the main vehicle frame or any subassembly such as frame subassembly 22 intended to be attached to the vehicle main frame. As shown, the vehicle frame subassembly 22 also includes a right wheel knuckle assembly 24 which is pivotally attached to the frame with upper and lower control arms 12 and 14 similar to the connections of knuckle assembly 10. For steering, the knuckle assemblies 10 and 24 are selectively pivoted about their vertical axis 16. The steering rods 26 and tie rod ends 28 are shown pivotally connected to the knuckle assembly 24 but not knuckle assembly 10 for illustration purposes. Normally, the tie rod end 28 would be connected to the knuckle assembly 10 at steering ear 30. It is further noted that additional components such as the brakes, springs, shock absorbers, etc., which are normally incorporated in the independent front suspension are not shown for illustration purposes.

The upper and lower control arms 12 and 14 are pivotally connected to the frame assembly 22 so as to pivot about an upper axis of rotation 32 and a lower axis of rotation 34, both of which are generally horizontally disposed as shown. In this manner, knuckle assemblies 10 and 24 are selectively movable vertically up and down as needed. More particularly, both the upper and lower control arms 12 and 14 are each provided with a rear mounting cylinder 36 and a front mounting cylinder 38. Each of the mounting cylinders 36 and 38 have a longitudinal bore 40 adapted to receive a bushing 42. As best seen in FIGS. 4 and 5, bushings 42 have an inner cylinder or sleeve 44 surrounded by a rubber sleeve 46 which is in turn surrounded by an outer sleeve 48. A separate sleeve 50 surrounding a bolt can be provided within the inner sleeve 44 as shown or, in the alternative, sleeves 44 and 50 can be a single integral sleeve forming and generally being a part of the bushing 42. As shown and more fully described hereinbelow, the mounting bolt 54 is coaxially received through sleeve 50.

After bushings 42 are placed within the bores 40 of the respective mounting cylinders 36 and 38, the upper and lower control arms 12 and 14 are pivotally connected to the frame assembly 22 by placing the mounting cylinders between mounting brackets attached to and extending from the frame assembly 22. More specifically, the lower control arm 14 is pivotally connected by placing the rear mounting cylinder 36 between rear lower mounting brackets 52 and inserting and placing a mounting bolt 54 through mounting bracket holes 56 and bushing 42. Washers 58 and a lock nut 60 are used in a known and customary manner as shown to secure bolt 54. The front mounting cylinder 38 of the lower control arm 14 is similarly pivotally mounted with a mounting bolt 54, etc., except that the mounting cylinder 38 is placed between front lower mounting brackets 62.

The upper control arm 12 is pivotally attached to the frame assembly 22 in a similar fashion as the lower control arm 14. The rear mounting cylinder 36 of upper control arm 12 is placed between rear upper mounting brackets 64 and the front mounting cylinder 38 is placed between front upper mounting brackets 66. Using the mounting bolts 54, washers 58, bushings 42 and lock nuts 60, as shown, the rear mounting cylinder 36 is pivotally attached between the rear upper mounting brackets 64 whereas the front mounting cylinder 38 is pivotally connected between the front upper mounting brackets 66. It is noted that, similar to the lower mounting brackets 52 and 62, brackets 64 and 66 are provided with mounting bracket holes 56 which are aligned with the mounting cylinders and bushings and are adapted to receive the bolts 54 therethrough. As can be appreciated, if the outside diameter of bolts 54 is the same as the diameter of the mounting bracket holes 56, the axes of rotation 32 and 34 would be collinear with the longitudinal axis of bolts 54 and mounting bracket holes 56. This would essentially fix the camber angle defined by movement of the upper control arm and thus knuckle assembly in the direction indicated by arrows 68 and it would also fix the caster angle defined by movement of the upper control arm and knuckle assembly in the direction of arrows 70. It is, however, desirable, both initially and after the vehicle has been placed in operation, to be able to adjust the camber and caster angles of the wheel supported on the knuckle assembly 10.

In accordance with the principles of the present invention, the camber and caster angles are selectively adjustable by providing an alignment device including an eccentric boss which is shown and generally designated by the numeral 72. The eccentric boss 72 may be located at the longitudinal ends of anyone or all of the rear and front mounting cylinders 36 and 38 of either one or both of the upper and lower control arms 12 and 14 although in the drawings eccentric bosses 72 are shown being used only on the longitudinal ends of the mounting cylinders 36 and 38 of the upper control arm 12.

Referring now more particularly to FIGS. 6–10, each eccentric boss 72 includes a circular portion 74 having a longitudinal axis 76 and an outer circular surface 78. The outer diameter of circular portion 74 is slightly smaller than the diameter of mounting bracket holes 56 so as to be received therein as shown in FIGS. 4 and 5. An adapter plate 80, is provided adjacent to the circular portion 74 and is formed integral therewith. The adapter plate 80 as shown, is larger in diameter and extends beyond the circular portion outside diameter. Adapter plate 80 has an inside annular flat surface 82 adapted to fit flush against a bracket 52, 62, 64 or 66.

A rotational adjustment portion 84 is also provided adjacent the adapter plate 80, integrally formed therewith and, as shown, sandwiching the adapter plate 80 between the rotational adjustment portion 84 and circular portion 74. The rotational adjustment portion 84 includes four contact surfaces 86 circumscribing the rotational adjustment portion longitudinal axis 88 thereby forming a square nut as shown. Thus, by using a common wrench on the contact surfaces 86 in a known and customary manner, the eccentric boss 72 can selectively be rotated about the longitudinal axis 88.

The eccentric boss 72 further includes a bolt hole 90 extending through circular portion 74, adapter plate 80 and the rotational adjustment portion 84. Bolt hole 90 is sized and has a diameter slightly larger than bolts 54 so as to selectively receive a bolt 54 therethrough as, for example, shown in FIGS. 4 and 5. It is noted that the bolt hole 90 has a longitudinal axis 88 which is collinear with the longitudinal axis of the rotational adjustment portion 84 but which is offset from the longitudinal axis 76 of the circular portion 74 and the adapter plate 80. As should be evident, the longitudinal axes of the circular portion 74 and the adapter plate 80 are collinear (axis 76).

Figure 2:
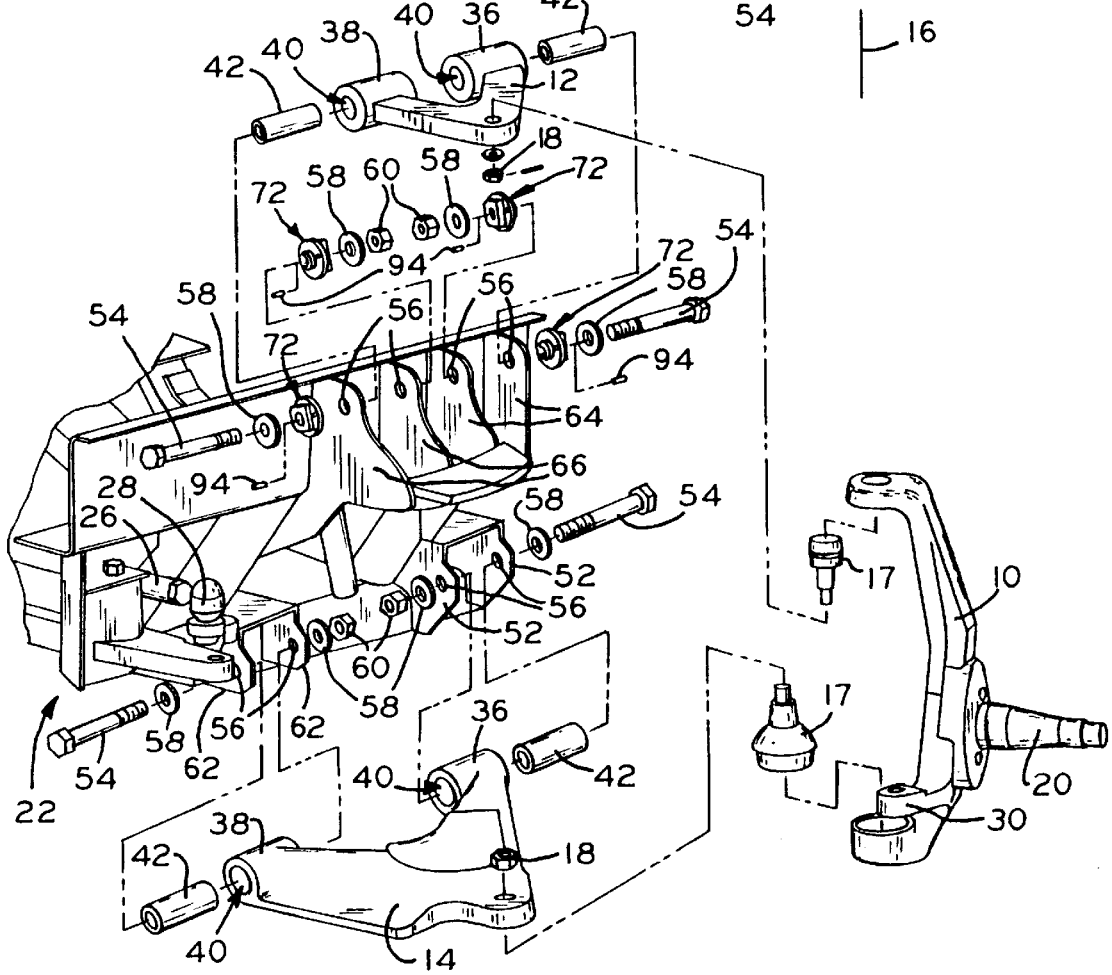
FIG. 2 is a partial exploded perspective view of the assembly shown in FIG. 1

The eccentric boss 72 further includes a threaded set screw hole 92 for receiving a threaded set screw 94 therein as shown in FIGS. 2 and 5. Set screws 94 are adapted to selectively contact the mounting brackets adjacent the annular flat surface 82 and thereby prevent rotational movement of the eccentric boss 72. As shown, the threaded set screw hole 92 is located radially further away from the tool contact surface 86, generally parallel to the longitudinal axes 76 and 88 and extending only through the adapter plate 80.

It is noted that all of the various component parts described hereinabove are preferably all made of steel except as otherwise noted. The eccentric bosses 72 are also preferably made of hardened steel.

In operation, the eccentric bosses 72 are installed by placing their circular portions 74 into the mounting bracket holes of the set of mounting brackets 52, 54, 62 and/or 64. The bushing 42 is then placed into the control arm mounting cylinder and the mounting cylinder is then placed between the respective mounting brackets aligning the eccentric boss bolt hole 90 with the bores of bushing sleeves 50 and 44. A bolt 54 is inserted through the bolt holes 90 and the bore of sleeve 50 and is secured by threading the lock nut 60 thereon without initially fully tightening.

To adjust the camber and caster angles of the wheel, the circular portion 74 of the eccentric boss 72 must be engaged and at least partially received within a respective mounting bracket hole 56 so that the mounting bracket hole may guide the circular portion for rotation about its axis 76. In this manner, when eccentric boss 72 is rotated about the axis of rotation 76, the mounting bolt is cause to move in an eccentric path due to the offset of axes 76 and 88. With the mounting bolt 54 not yet fully clamped and set screw 94 disengaged from the respective mounting bracket whereat the eccentric boss is located, a wrench is placed on the contact surfaces 86 of the eccentric boss and the eccentric bosses 72 are rotated as may be desired. By rotating the eccentric boss 72 and because the diameter of the mounting bolt 54 is substantially the same or slightly smaller than the bolt hole 90, the mounting bolt 54 and, thus, also the bushing 42 and the mounting cylinder of the control arm, are selectively caused to move up, down, back and forth. This movement thus causes the control arm to move relative to its pivotal mount on the mounting brackets for thereby adjusting the camber and caster angles of the wheel as may be desired.

Upon achieving the correct camber and caster angles, the set screws 94 are rotated for at least partially locking the eccentric boss 72 thereof at the desired rotational position. Thereafter, lock nut 60 is fully tightened causing the mounting brackets at the longitudinal end of the mounting cylinder to come in contact with and become frictionally engaged with sleeve 44 and/or sleeve 50 and thereby also placing sleeve 44 and/or sleeve 50 in compression as, for example, shown in FIG. 5. The set screws 94 are then fully tightened. As can be appreciated, the frictional engagement of the eccentric boss various surfaces along with the set screw 94 prevent the inadvertent rotation of the eccentric boss 72 and retain it in the desired position for thereby locking in the desired camber and caster angles.

While the invention has been described as having specific embodiments, it will be understood that it is capable of further modifications. This applications is, therefore, intended to cover any variations, uses, or adaptations of the invention following the general principles thereof and including such departures from the present disclosure as come within known or customary practice in the art to which this invention pertains and fall within the limits of the appended claims.

What is claimed is:

1. In an independent front suspension including a knuckle assembly pivotally supported by upper and lower control arms, the upper and lower control arms pivotally connected to a vehicle frame assembly, one of the control arms having two mounting cylinders, each of the mounting cylinders located between mounting brackets extending from the vehicle frame assembly and, wherein, holes are provided on the mounting brackets aligned with the mounting cylinders therebetween, bolts extending through each of the mounting cylinders and the bracket holes at the cylinder longitudinal ends thereby pivotally attaching each of the mounting cylinders between the respective mounting brackets, an alignment device comprising:

an eccentric boss located at each of the mounting bracket holes at the longitudinal ends of one of the control arm mounting cylinders, the boss comprising a circular portion having a longitudinal axis and an outside diameter smaller than the bracket hole and at least partially received therein;

a bolt hole extending through said circular portion and having a longitudinal axis offset from said circular portion longitudinal axis;

said boss further including an adapter plate adjacent said circular portion extending radially beyond the circular portion outside diameter and radially beyond the bracket holes;

a rotational adjustment portion adjacent said adapter plate having a tool contact surface whereat a tool may be selectively placed for rotating said boss about said circular portion longitudinal axis;

wherein said adapter plate has a generally circular outside surface and a longitudinal axis which is collinear with said circular portion longitudinal axis;

wherein said rotational adjustment portion includes a plurality of tool contact surfaces circumscribing a rotational adjustment portion longitudinal axis and forming a nut; and, wherein said rotational adjustment portion longitudinal axis is collinear with said bolt hole longitudinal axis.

2. The alignment device of claim 1 wherein said rotational adjustment portion includes a total of four contact surfaces forming a square nut.

3. The alignment device of claim 2 further comprising a threaded set screw hole extending through said adapter plate and threadingly receiving a set screw adapted to selectively contact the mounting bracket adjacent thereto and prevent rotational movement of said eccentric boss.

4. The alignment device of claim 3 wherein said threaded set screw hole is located radially further away than said tool contact surface and generally parallel to said circular portion longitudinal axis.

5. The alignment device of claim 4 further comprising a sleeve received in the mounting cylinder and around the bolt extending therethrough, said sleeve extending to the mounting brackets at the longitudinal ends of the mounting cylinder.

6. The alignment device of claim 5 wherein an eccentric boss is also used on the mounting bracket holes at the longitudinal ends of the other of the control arm mounting cylinders.

7. The alignment device of claim 1 further comprising a sleeve received in the mounting cylinder and around the bolt extending therethrough, said sleeve extending to the mounting brackets at the longitudinal ends of the mounting cylinder.

8. The alignment device of claim 1 further comprising a threaded set screw hole extending through said adapter plate and threadingly receiving a set screw adapted to selectively contact the mounting bracket adjacent thereto and prevent rotational movement of said eccentric boss.

9. The alignment device of claim 8 wherein said threaded set screw hole is located radially further away than said tool contact surface and generally parallel to said circular portion longitudinal axis.

10. In an independent front suspension including a knuckle assembly pivotally supported by upper and lower control arms, the upper and lower control arms pivotally connected to a vehicle frame assembly, one of the control arms having two mounting cylinders, each of the mounting cylinders located between mounting brackets extending from the vehicle frame assembly and, wherein, holes are provided on the mounting brackets aligned with the mounting cylinders therebetween, bolts extending through each of the mounting cylinders and the bracket holes at the cylinder longitudinal ends thereby pivotally attaching each of the mounting cylinders between the respective mounting brackets, an alignment device comprising:

an eccentric boss located at each of the mounting bracket holes at the longitudinal ends of one of the control arm mounting cylinders, the boss comprising a circular portion having a longitudinal axis and an outside diameter smaller than the bracket hole and at least partially received therein;

a bolt hole extending through said circular portion and having a longitudinal axis offset from said circular portion longitudinal axis;

said boss further including an adapter plate adjacent said circular portion extending radially beyond the circular portion outside diameter and radially beyond the bracket holes;

a rotational adjustment portion adjacent said adapter plate having a tool contact surface whereat a tool may be selectively placed for rotating said boss about said circular portion longitudinal axis;

further comprising a threaded set screw hole extending through said adapter plate and threadingly receiving a set screw adapted to selectively contact the mounting bracket adjacent thereto and prevent rotational movement of said eccentric boss;

wherein said rotational adjustment portion includes a plurality of tool contact surfaces circumscribing a rotational adjustment portion longitudinal axis and forming a nut; and, wherein said rotational adjustment portion longitudinal axis is collinear with said bolt hole longitudinal axis.

11. The alignment device of claim 10 wherein said threaded set screw hole is located radially further away than said tool contact surface and generally parallel to said circular portion longitudinal axis.

12. The alignment device of claim 10 wherein said rotational adjustment portion includes a total of four contact surfaces forming a square nut.

13. In an independent front suspension including a knuckle assembly pivotally supported by upper and lower control arms, the upper and lower control arms pivotally connected to a vehicle frame assembly, one of the control arms having two mounting cylinders, each of the mounting cylinders located between mounting brackets extending from the vehicle frame assembly and, wherein, holes are provided on the mounting brackets aligned with the mounting cylinders therebetween, bolts extending through each of the mounting cylinders and the bracket holes at the cylinder longitudinal ends thereby pivotally attaching each of the mounting cylinders between the respective mounting brackets, an alignment device comprising:

- an eccentric boss located at each of the mounting bracket holes at the longitudinal ends of one of the control arm mounting cylinders, the boss comprising a circular portion having a longitudinal axis and an outside diameter smaller than the bracket hole and at least partially received therein;
- a bolt hole extending through said circular portion and having a longitudinal axis offset from said circular portion longitudinal axis;
- said boss further including an adapter plate adjacent said circular portion extending radially beyond the circular portion outside diameter and radially beyond the bracket holes;
- a rotational adjustment portion adjacent said adapter plate having a tool contact surface whereat a tool may be selectively placed for rotating said boss about said circular portion longitudinal axis;
- wherein said rotational adjustment portion includes a plurality of tool contact surfaces circumscribing a rotational adjustment portion longitudinal axis and forming a nut; and,
- wherein said rotational adjustment portion longitudinal axis is collinear with said bolt hole longitudinal axis.

14. The alignment device of claim 13 wherein said rotational adjustment portion includes a total of four contact surfaces forming a square nut.

15. The alignment device of claim 13 wherein an eccentric boss is also used on the mounting bracket holes at the longitudinal ends of the other of the control arm mounting cylinders.

16. The alignment device of claim 13 further comprising a sleeve received in the mounting cylinder and around the bolt extending therethrough, said sleeve extending to the mounting brackets at the longitudinal ends of the mounting cylinder.

* * * * *